United States Patent
Bermudez Miquel et al.

(10) Patent No.: US 10,633,068 B2
(45) Date of Patent: Apr. 28, 2020

(54) SAIL HAVING VARIABLE PROFILE

(71) Applicants: BOUND4BLUE, SL, Castelldefels (ES); Jose Miguel Bermudez Miquel, Piera (ES); Cristina Aleixendri Munoz, Piera (ES); Ignacio Bermudez Sanchez, Piera (ES); David Ferrer Desclaux, C/Castillejos (ES); Francisco Jose Saenz Sanez, Lleida (ES)

(72) Inventors: Jose Miguel Bermudez Miquel, Piera (ES); Cristina Aleixendri Munoz, Piera (ES); Ignacio Bermudez Sanchez, Piera (ES); David Ferrer Desclaux, C/Castillejos (ES); Francisco Jose Saenz Sanez, Lleida (ES)

(73) Assignee: BOUND4BLUE, SL, Barcelona (ES)

( * ) Notice: Subject to any disclaimer, the term of this patent is extended or adjusted under 35 U.S.C. 154(b) by 0 days.

(21) Appl. No.: 15/556,304

(22) PCT Filed: Mar. 9, 2016

(86) PCT No.: PCT/ES2016/070151
§ 371 (c)(1),
(2) Date: Sep. 7, 2017

(87) PCT Pub. No.: WO2016/142567
PCT Pub. Date: Sep. 15, 2016

(65) Prior Publication Data
US 2018/0072394 A1 Mar. 15, 2018

(30) Foreign Application Priority Data
Mar. 10, 2015 (ES) .................... 201530307

(51) Int. Cl.
*B63H 9/06* (2020.01)
*B63B 35/44* (2006.01)
*B63J 3/04* (2006.01)

(52) U.S. Cl.
CPC ............. *B63H 9/0614* (2013.01); *B63H 9/06* (2013.01); *B63B 2035/4433* (2013.01); *B63J 2003/046* (2013.01); *Y02T 70/70* (2013.01)

(58) Field of Classification Search
CPC ...................... B63H 9/0614; B63H 2009/0635
See application file for complete search history.

(56) References Cited

U.S. PATENT DOCUMENTS

| 2002/0100406 A1* | 8/2002 | Costa, Jr. | ............. B63H 9/0614 114/102.22 |
| 2015/0007761 A1* | 1/2015 | Buzzi | ................... B63H 9/0614 114/102.12 |

FOREIGN PATENT DOCUMENTS

| DE | 20114841 U1 | 1/2003 |
| ES | 2311399 A1 | 2/2009 |

(Continued)

*Primary Examiner* — Andrew Polay
(74) *Attorney, Agent, or Firm* — Kutak Rock LLP

(57) ABSTRACT

The invention relates to a sail having a variable profile. The sail can vary between a folded non-operative position and an unfolded operative position, wherein they determine the profile of the sail (2) and therefore the aerodynamic surface for contacting with the wind, characterised in that the sail comprises at least one sail element (24) which is inflatable and stiffenable, and which can be actuated by inflation (30) and stiffening means (29), between a folded position corresponding to said folded non-operative position and said unfolded operative position, in which the sail (2) is inflated. The profile of the sail is divided into sections (21, 22) on both sides of a shaft (20), and comprises a support structure (23) on which said inflatable sail elements (24) are disposed, said inflatable sail elements being formed by inflatable (Continued)

pockets (24) which can be actuated by said inflation (30) and stiffening means (29).

5 Claims, 4 Drawing Sheets

(56) References Cited

FOREIGN PATENT DOCUMENTS

| | | |
|---|---|---|
| FR | 2432431 A1 | 2/1980 |
| GB | 2151199 A | 7/1985 |

* cited by examiner

_US 10,633,068 B2_

SAIL HAVING VARIABLE PROFILE

CROSS REFERENCE TO RELATED APPLICATIONS

This application is a national phase filing under 35 U.S.C. § 371 of International Application No. PCT/ES2016/070151 filed Mar. 9, 2016, which claims priority from Spain application number P201530307, filed Mar. 10, 2015 the entire contents of which is hereby incorporated by reference herein.

TECHNICAL FIELD OF THE INVENTION

The present invention relates to a sail having a variable profile, configurable between a non-operative furled position and an operative unfurled position, determining the profile of the sail and therefore the aerodynamic surface in contact with the wind.

The sail having an inflatable profile of the present invention is of particular application as an element constituting a system for the conversion of energy, and more specifically a system to convert the force of the wind overseas and oceans into electrical energy and into non-fossil fuel, thanks to the electrolysis of the seawater into $H_2$ and/or $O_2$.

BACKGROUND OF THE INVENTION

In fluid mechanics, it is known that the efficiency of sails made of fabric is less than that of the wings of aircraft. In the latter, the difference between the lift force and the weight enables the aircraft to fly, due to the aerodynamic boundary layer of the air not being separated from the profile. Conversely, in conventional sails in the naval sector, it is the thrust of the wind that fills the sail and produces, by means of its thrust, a resulting force which enables the forward movement of the boat or ship.

It has been desired for many years to achieve a sail for aquatic navigation that presents the advantages of an aircraft wing. To this end, there have been numerous attempts to achieve rigid sails with an aerodynamic profile of an aeronautical nature.

Among these, the Flettner-type rotors are worthy of mention; these were described in 1926 by Anton Flettner (FLETTNER, Anton _Mein Weg zum Rotor_, Leipzig (Köhler & Amelang, 1926)), quoted previously, for example, in the European patent document EP 040 597.

Document WO2004024556 describes a rigid sail comprised of two parts that may rotate around a vertical shaft to determine the intrados and extrados of a sail by way of an aerodynamic profile of the kind used for wings in aeronautical technology.

Document WO0189923 describes a rigid sail with an articulated aerodynamic profile comprised of three vertical elements (or modules), each of which is formed by three horizontal elements (or sections), mutually articulated or extrados of the wing or rigid sail.

Patent FR2648426 describes a wing comprised of a rigid part and a flexible part which is retracted into the interior of a housing in the rigid part, enabling different aerodynamic configurations.

U.S. Pat. No. 7,146,918 describes a system for the generation of electrical energy and hydrogen from seawater and wind energy in systems floating in the water and which comprise rigid sails.

The problem entailed in the generation system of U.S. Pat. No. 7,146,918 is that the operation, control and regulation of the sails is complex, with the consequent loss of performance and predictability in the production of power and $H_2$. For example, a significant problem is that should the wind change direction by 180°, it becomes necessary to perform the operation of turning the sails, which may be complex and hazardous.

Notwithstanding this profusion of attempts, of which only a number of illustrative examples have been listed, a device that is versatile, economical and simple to operate has to date not yet been achieved.

Document EP2202144A1 describes a rigid sail having a configurable profile, with elastic enclosing sheets, joined to the corresponding wall in at least one zone near the furthest edge and a means for the generation and supply of air under pressure and of a vacuum in order to inflate and deflate the sails to modify the profile of the sail as desired. This sail provides a solution to this requirement.

U.S. Pat. No. 8,601,966 describes sails with an aerodynamic profile, foldable and unfoldable as in the style of an accordion bellows, and which provide an effective, high-performance solution for the production of hydrogen and other chemical species with a high enthalpic content. The sails form an array formed by opposing pairs of sails, each of which comprises a number of extendable masts, a number of sections longitudinally displaceable along said masts and a number of panels, articulatedly joined to the sections and to each other, forming the lateral surface of each sail. Said panels are operative between two positions: an unfurled operative position, wherein they are essentially coplanar and longitudinally aligned in an essentially vertical direction; and a furled stowing position, wherein they are stacked as in the manner of a bellows, jointly with the sections in an essentially horizontal position.

Notwithstanding the efficiency and versatility of the sail of U.S. Pat. No. 8,601,966, the method of furling might present drawbacks of a mechanical and operative nature, when it might be attempted to furl or unfurl rapidly, for example due to a change in the climatic conditions.

One of the objectives of the present invention is to provide a simultaneous solution to the aforementioned problems and drawbacks.

SUMMARY OF THE INVENTION

To this end, the object of the invention is a sail having a variable profile, with a novel concept and functionality, which essentially is characterized in that it comprises at least one inflatable and stiffenable sail element, operable by an inflating and stiffening means, between a furled position, said furled position corresponding to a non-operative position, and said unfurled operative position, where the sail having a configurable profile is inflated and rigid.

In accordance with another characteristic of the present invention, the profile of the sail is divided into sections on both sides of a shaft, and comprises a supporting structure, being disposed thereon said inflatable sail elements, these being constituted of inflatable bags, operable by said inflating and stiffening means.

The sail may rotate around the shaft, guided at its lower part by a carriage around a number of circular tracks.

The shaft may comprise a triangular reinforcing column, to endow the supporting structure with greater strength.

In accordance with another characteristic of the sail that is the object of the invention, said sail is covered externally by a technical fabric that adapts to the shape of the sail profile at all times, and which encloses the array of inflatable bags.

Preferably, the profile of the sail corresponds to the profile of the wing of an aircraft.

BRIEF DESCRIPTION OF THE DRAWINGS

The attached drawings illustrate, as a non-limiting example, an embodiment of the sail having a variable profile which is the object of the invention. In said drawings.

DETAILED DESCRIPTION OF THE DRAWINGS

Figure 1:
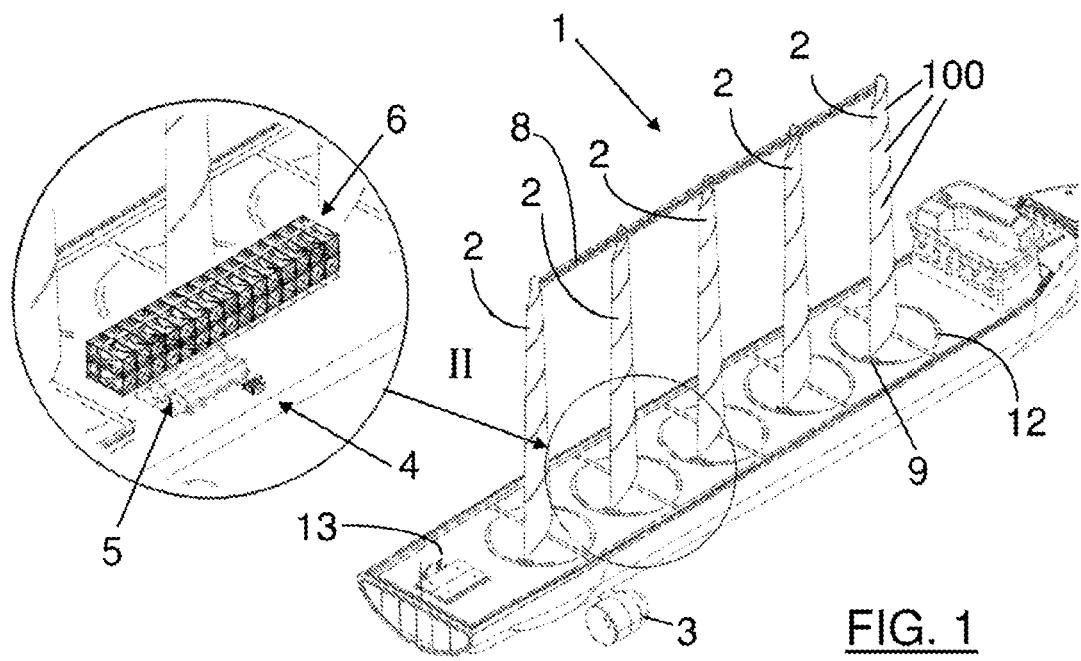
FIG. 1 is a perspective view of a ship featuring the sails of the invention.

Said drawings portray the constitution and operational method of an embodiment of the sail 2 having a variable profile, configurable between a non-operative furled position and an operative unfurled position, where the profile of the sail and therefore the aerodynamic surface in contact with the wind are determined.

In the example portrayed, the sail 2 is assembled jointly with other identical or similar sails 2 on a ship 1, which is propelled by the sails 2 and which features a system for the generation and storage of energy, for example by means of the generation and storage of hydrogen, oxygen, methanol, ethanol, ammonia, etc.

The invention is based on the combination of the wind speed with the high density of the water, causing the yield to be much greater than that of any other system based on the wind as a source of primary energy.

Its principle is that of a ship 1 especially designed for the production of hydrogen (and/or oxygen), obtained by means of the electrolysis of the water from the sea or lake, and featuring the sails 2 of the invention.

In the drawings, it may be seen that the system for the production of hydrogen from seawater, in accordance with the present invention, comprises:

a ship 1, designed and able to withstand all the necessary structural loads and to house the storage system within its interior:
  equipped with sails 2 whose purpose is to propel the ship for said ship to gain speed;
submerged turbines 3, which rotate due to the speed of the ship in relation to the water and which generate mechanical energy, in turn supplying the electrolysis equipment and the auxiliary equipment. The turbines 3 rotate due to the speed of the ship 1 in relation to the water and generate mechanical energy, in turn supplying the $H_2$ generation equipment 5 and the auxiliary equipment of the ship 1;
an electrical generator 4 adapted to transform the rotation of the turbines 3 into electricity;
an on-board hydrogen generation system 5 to produce $H_2$ and $O_2$ from the electrical energy produced by the generator 4;
storage means 6, for example based on high-pressure ISO containers for $H_2$ and $O_2$ (30 bar, 300 bar or greater).

In accordance with the present invention, different variants are possible for the $H_2$ generation system, among these, and not limitatively:

by Electro-Chemical Activation (ECA) of the seawater in ECA cartridges 11 by means of the addition of an electrolyte. In this case an additional electrolyte may be provided, or the salinity of the seawater itself may be sufficient; and
  a water electrolysis system through filtration, microfiltration and/or ultrafiltration element membranes 10.

Figure 2:
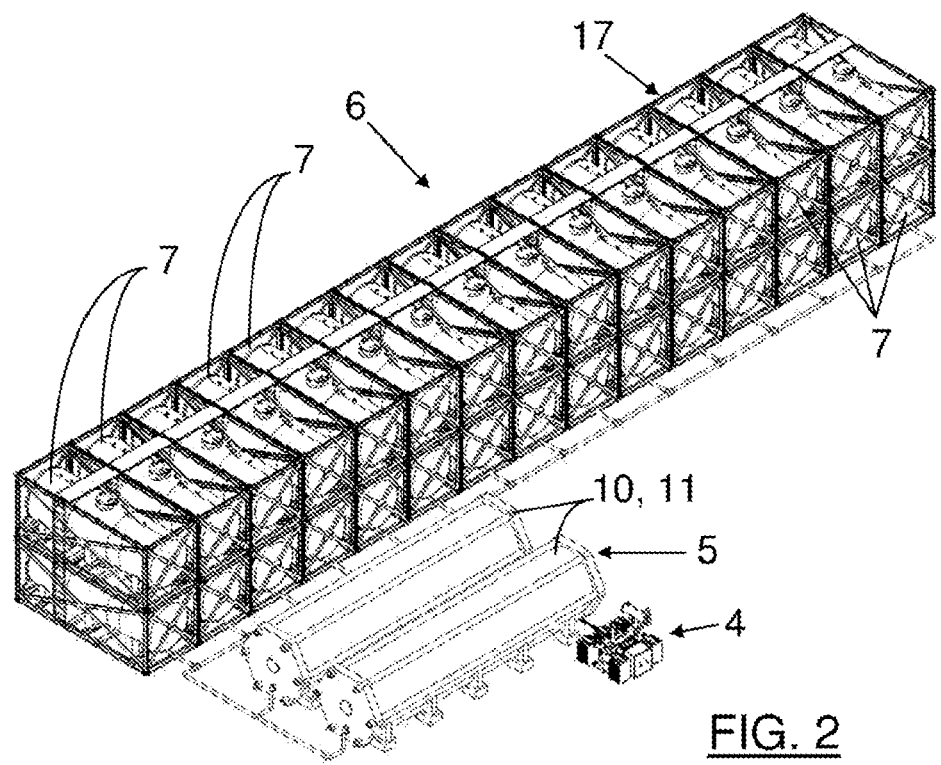
FIG. 2 is a detailed view according to II of FIG. 1, illustrating in particular an electrical generator, the hydrogen/oxygen production system, activated by the force of the wind collected by the sails, and with a means for the storage of hydrogen/oxygen.

The process by which $H_2$ and $O_2$ are generated and stored is as follows:
  the ship 1 leaves port by using an engine (not portrayed), either of the conventional type or fed by a hydrogen fuel cell, and proceeds to an area where the force of the wind is high.
  Once there, the ship 1 cuts its engine and proceeds under sail, using the unfurled sails 2, following the direction with the greatest wind force, merely to attain a high speed. The greater the speed of the ship 1, the greater the production of hydrogen and oxygen.
  By means of this process, the ship 1 gains speed in relation to the sea; this is exploited for the generation of mechanical energy due to the submerged turbines 3.
  This mechanical energy, transformed into electrical energy, would feed the hydrogen generation systems 5 and the auxiliary equipment for the performance of the electrolysis or electro-chemical activation (ECA) of the pre-conditioned water, separating it into hydrogen and oxygen, or other chemical species in the case of ECA (e.g. Cl and its compounds).
  The gases would be stored on board under pressure, firstly in a gaseous state or by means of chemical or cryogenic storage, in gas storage means 6 featuring, in the example portrayed (FIGS. 1 and 2), tanks 7 for hydrogen, oxygen, etc.
  When the tanks 7 or the chemical storage components (cells) are full, the ship 1 returns to port to unload and to recommence the process.
  Ideally it is hoped to work with storage at standard pressure in ISO containers, which may subsequently be unloaded at any port with no need for any special infrastructures, although it is foreseen that other means of storage may be used, such as large spherical tanks or chemical storage elements (cells).

In accordance with the invention, the sails 2 are stiffenable sails having a profile configurable between a non-operative furled position (FIG. 3) and an operative unfurled position (FIGS. 1, 4 and 5) where they determine the profile of the sail 2 and therefore of the aerodynamic surface in contact with the wind. Preferably, the sails 2 in their inflated and stiffened form shall acquire a profile similar to the wing of an aircraft.

Each sail 2 is formed by profile elements 100 (FIGS. 3, 4 and 5) divided into equal sections 21, 22 that pivot on a joint 26 of a tubular type, disposed on both sides of a shaft 20, and comprise a supporting structure 23, in the form of a lattice, upon which a number of sail elements 24 are disposed, these being constituted of inflatable bags 24, operable individually or collectively, by an inflation means 30, between an uninflated position, corresponding to the furled position, and an inflated and stiffened position, corresponding to the unfurled position, where they determine the profile of the sail 2 and therefore of the aerodynamic surface in contact with the wind.

The lattice-like structure 23 features a shape such as that of the trailing edge of the aerodynamic profile, in order that when the inflatables are to be deployed it should not be necessary to operate those of one half of the profile, which may remain totally uninflated.

Once the two sections 21 and 22 of the elements of the profile 100 have been attached and anchored together, and the elements of the profile 100 have been attached together, the sails 2 may rotate around the shaft 20, guided at their lower and upper parts by a carriage 9 with bearings around a number of circular tracks 12 on the deck 13 of the ship 1 and at their upper rotating shaft.

The central shaft 20 and the sections 21 and 22 in contact with the same transmit the force to the entirety of the ship and hold the assembly of the lattice-like supporting structure 23. All the elements of the profile 100 are anchored to said central shaft 20.

Figure 8:
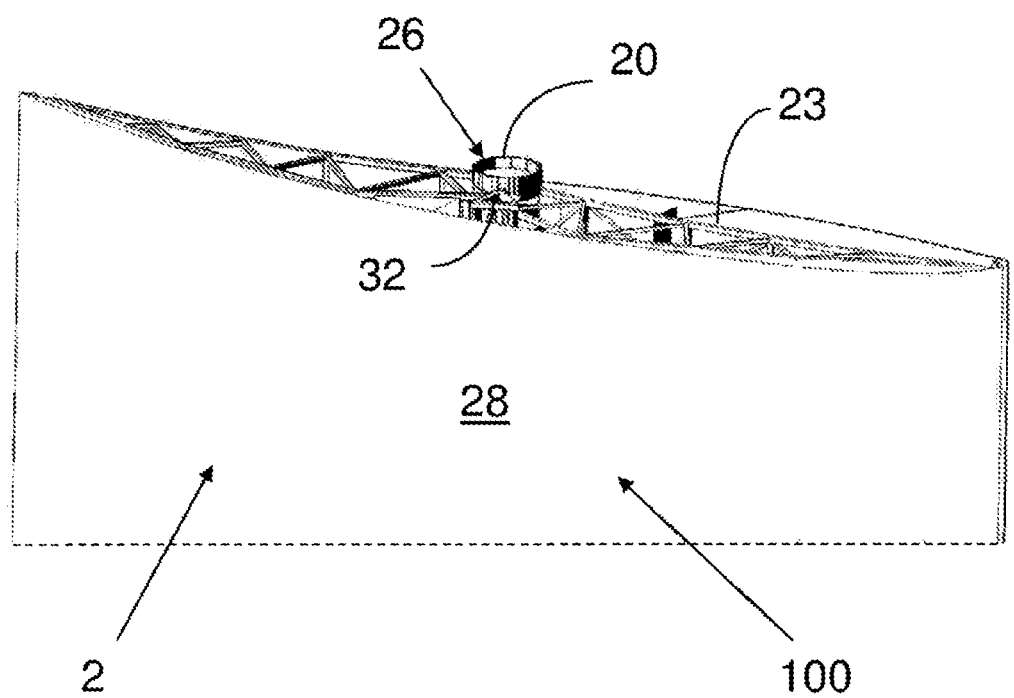
FIG. 8 is a perspective view, similar to that in FIG. 4, in which the cover 28 may be clearly seen in the unfurled position of the sail.

There exist a number of vertical elements 27 at the two edges of the supporting structure which act as a guide for an external cover 28 (FIGS. 4 and 8) which may be furled either below the structure, on the deck, or at the upper part. This external cover 28 may be a technical fabric which adapts to the shape of the profile of the sail 2 at all times, and which encloses the array of inflatable bags 24. For greater clarity, in FIGS. 1 and 5 the sails 2 are portrayed without the external cover 28.

The shaft 20 of the embodiment portrayed comprises a triangular reinforcing column 32, to endow the lattice-like supporting structure 23 with greater strength (FIGS. 2 to 5). The triangular reinforcing column 32 may be replaced by a differently-shaped element that performs the same function.

Figure 3:
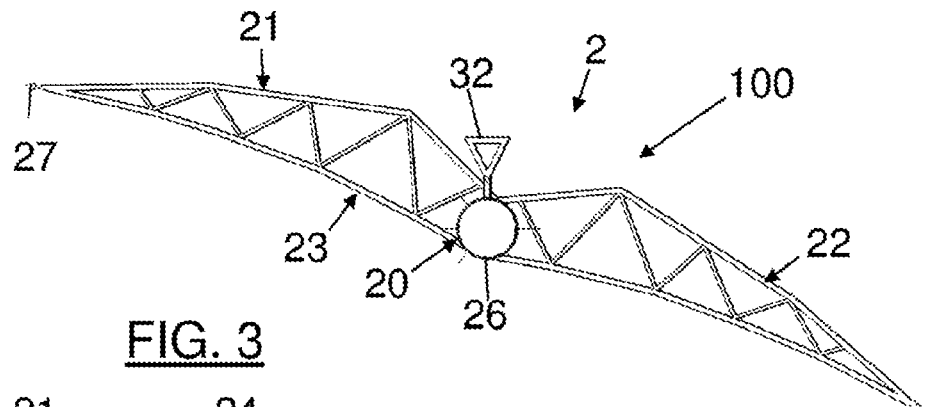
FIG. 3 is a plan view of a sail profile in accordance with the invention, in its furled position.
Figure 4:
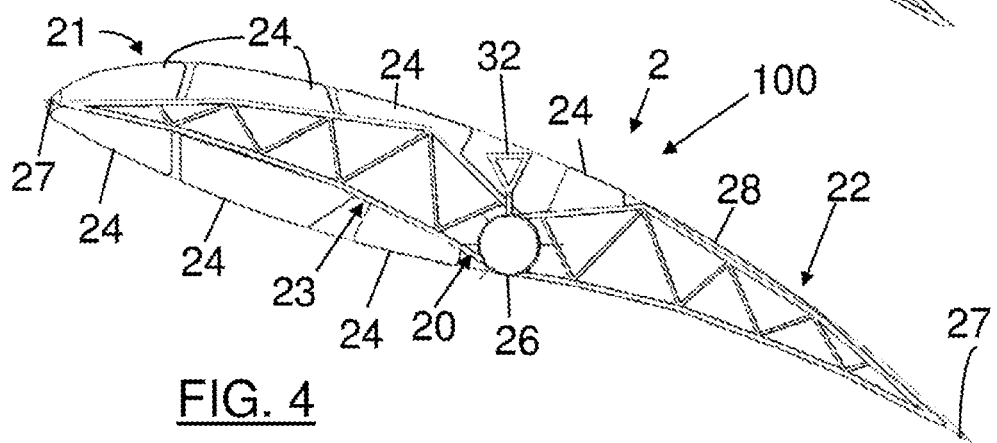
FIG. 4 is a view analogous to that of FIG. 3, but with the sail profile in its unfurled position and with the inflatable bags inflated.
Figure 5:
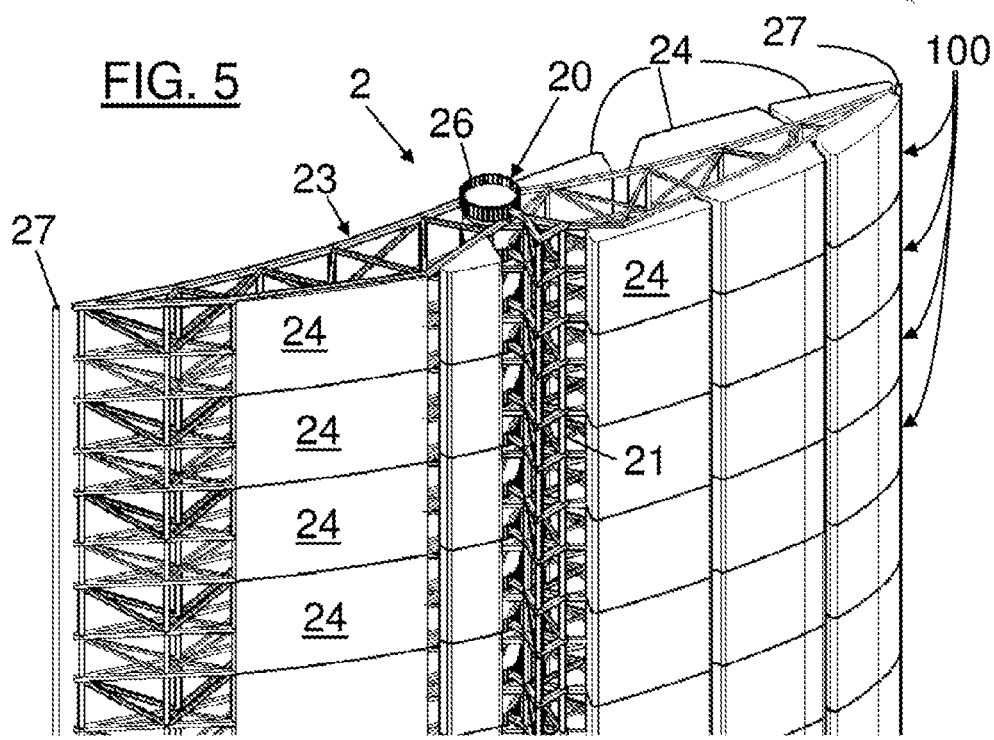
FIG. 5 is a perspective view of the rigid sail in FIG. 4.

In some embodiments, referring to FIGS. 3, 4, and 5, the shaft 20 is positioned at an intermediate location along the profile of the sails 2. While FIGS. 3, 4, and 5 depict the shaft 20 in a generally centralized location along the profile of the sails 2, it will be easily understood by those ordinarily skilled in the art that the shaft 20 is placeable at many locations within said profile while still remaining at an intermediate position with respect to the vertical elements 27 at the two edges of the sail 2.

As an additional detail, the entirety of the array of sails 2 may be linked by an upper walkway 8 (FIG. 1) to endow the array with greater strength.

Figure 6:
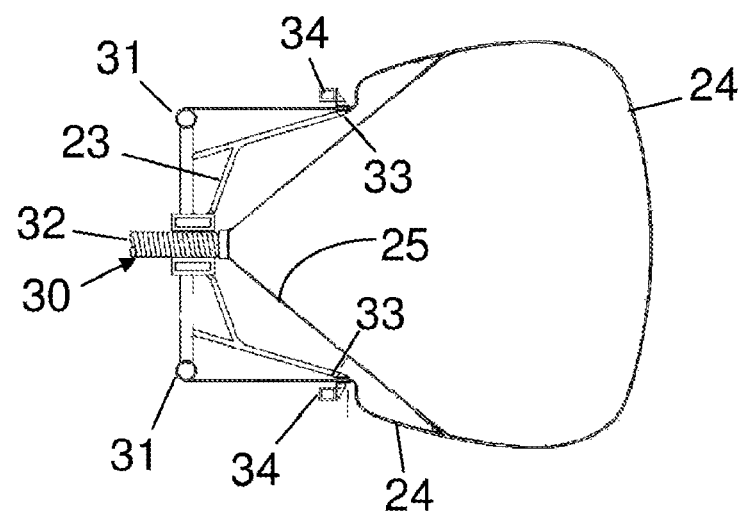
FIG. 6 is a plan view illustrating the method of inflation of an embodiment of the inflatable bag of the sail of the present invention.
Figure 7:
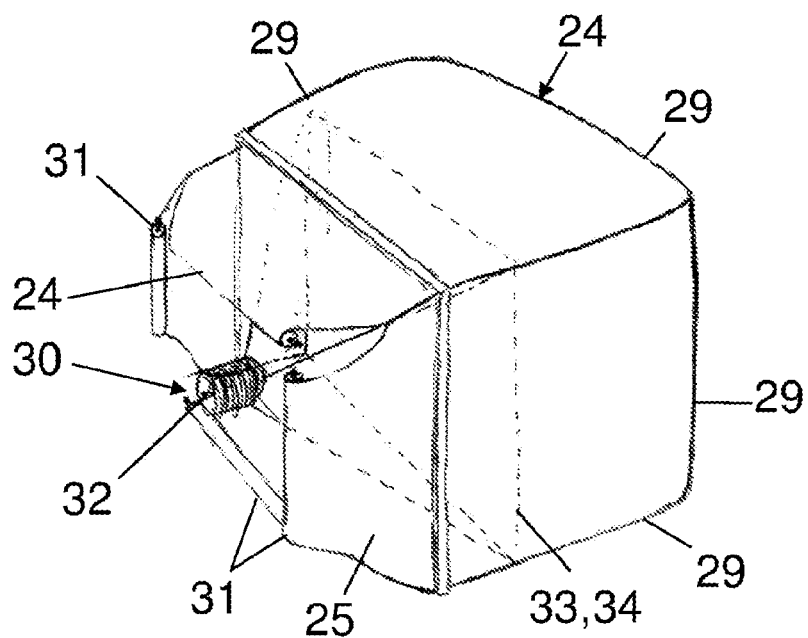
FIG. 7 is a perspective view corresponding to the plan view in FIG. 6.

As has been mentioned above, to form the shape of the aerodynamic profile, the assembly features a series of inflatable sail elements 24 which may be inflated at will by an inflation means 30, by means of compressed air through pipes and common pressure systems distributed throughout the lattice-like supporting structure 23 of the sail 2, it being possible at all times for the sail 2 to adopt different shapes and configurations by means of this system. A non-limitative example of the operation of the inflatable sail elements 24 is described hereunder, with particular reference to FIGS. 6 and 7:

The inflation system 30 for the configuration of adaptable profiles consists of inflatable bags 24, preferably of plastic material (e.g. PVC) and featuring an internal lining 25.

Said inflatable bag 24 is held taut by means of a number of motorized rollers 31 which take in or release the inflatable bag 24, while the internal lining 25, which is attached to the inflatable bag 24 by means of a thermowelded joint or similar, features an injector tube 32 for pressurized air; said tube is affixed to a framework of the lattice-like support structure 23 which will maintain it in a fixed position and further will act as a support to hold an internal frame 33.

This internal frame 33 is disposed within the inflatable bag 24 but outside the lining 25, and has its analogue in an external frame 34; these perform a guiding function, enabling the tautening and releasing of the fabric of the inflatable bag 24. The external frame 34 will be affixed to the general structure, as will the internal frame 33. Said frame provides stability, positioning and stiffness against the tangential forces that might be generated by the wind.

The sail 2 formed by the inflatable bags 24 is also stiffenable. To this end, the inflatable bag features as a stiffening means an inflated shape with pre-formed seams 29 (FIG. 7), in such a way that the inflatable bag 24 increases or reduces its volume, but with a rigid, pre-designed shape, in the same manner as the well-known airbag devices of cars. In FIGS. 4 and 5 it may be clearly seen how the inflatable bags 24 feature different shapes and maximum volumes, once the operational, unfurled, inflated and rigid position is attained.

This invention resolves the question of the creation of configurable, adaptable volumes for any system that might require this possibility, such as sails having a configurable profile, or blades for wind turbine generators.

Those skilled in the art will note that the sails 2 of the system of the invention feature total symmetric duality, as the sails 2 may be configured toward one side or the other and with variable volumes, making it unnecessary for them to be rotated 180° in the event that the wind might come from the opposite direction. Likewise, for certain variations in the direction or speed of the wind, it is not necessary for the ship of the system of the present invention to change its direction.

The nature of the present invention and the method for the implementation of the same having been sufficiently described, it is stated that any difference that does not alter, change or modify its fundamental purpose shall be subject to variations in detail.

In this sense, the stiffenable sails 2 having a configurable profile of the present invention may adopt other embodiments different from that explained in relation to the preferred embodiment based on inflatable elements or bags 24. The sail 1 may also find applications different from that described herein, concerning its application in a ship 1 for a hydrogen production system.

Similarly, the number of profile elements 100, likewise that of sail elements (or inflatable bags) 24 may be any number, including a single unit, while remaining within the scope of protection of the claims.

What is claimed is:

1. A sail having a variable profile, between a non-operative furled position and an operative unfurled position, determining the profile of the sail and therefore the aerodynamic surface in contact with the wind, characterized in that the sail comprises at least one inflatable and stiffenable sail element,
    operable by an inflating means and stiffening means,
        between a furled position,
    said furled position corresponding to a non-operative position, and
    said unfurled operative position,
    where the sail is inflated,
        wherein a shaft is placed in an intermediate position in the longitudinal direction of the sail;

wherein said sail further comprises a supporting structure on which said inflatable sail elements are disposed;

wherein said elements are constituted of inflatable pockets, operable by said inflation means and stiffening means; and wherein the sail may rotate around the shaft.

2. A sail having a variable profile, as claimed in claim 1, characterized in that the sail may rotate around the shaft, guided at its lower part by a carriage around a number of circular tracks.

3. A sail having a variable profile, as claimed in claim 1, characterized in that the shaft comprises a reinforcing column to endow the supporting structure with greater strength than the supporting structure without the reinforcing column.

4. A sail having a variable profile, as claimed in claim 1, characterized in that the sail is covered externally by a technical fabric which adapts to the shape of the sail profile at all times, and which encloses the array of inflatable pockets.

5. A sail having a variable profile, as claimed in claim 1, characterized in that the profile of the sails is the profile of the wing of an aircraft.

* * * * *